United States Patent [11] 3,610,731

[72] Inventor Harold Seidel
Warren Township, Somerset County, N.J.
[21] Appl. No. 825,836
[22] Filed May 19, 1969
[45] Patented Oct. 5, 1971
[73] Assignee Bell Telephone Laboratories, Incorporated
Murray Hill, Berkeley Heights, N.J.

[54] BISTABLE OPTICAL CIRCUIT USING SATURABLE ABSORBER WITHIN A RESONANT CAVITY
6 Claims, 4 Drawing Figs.
[52] U.S. Cl. ................................................ 350/160,
307/312
[51] Int. Cl. .................................................... G02f 1/28,
H03k 23/12
[50] Field of Search ............................................ 307/312,
212; 350/160; 331/94.5

[56] References Cited
UNITED STATES PATENTS
| | | | |
|---|---|---|---|
| 3,270,291 | 8/1966 | Kosonocky | 331/94.5 |
| 3,281,713 | 10/1966 | Soules | 331/94.5 |
| 3,500,234 | 3/1970 | Goedertier | 331/94.5 |
| 3,439,289 | 4/1969 | Kosonocky | 307/312 X |
| 3,476,459 | 11/1969 | Reader | 331/94.5 |

Primary Examiner—Ronald L. Wibert
Assistant Examiner—V. P. McGraw
Attorneys—R. J. Guenther and Arthur J. Torsiglieri ABSTRACT: The hysteresis effect produced by a saturable absorber disposed within a resonant cavity is utilized in a bistable optical circuit. Use in an optical memory and optical data-processing system is contemplated.

INVENTOR
H. SEIDEL 3,610,731

BISTABLE OPTICAL CIRCUIT USING SATURABLE ABSORBER WITHIN A RESONANT CAVITY

This invention relates to bistable optical circuits and optical limiters.

BACKGROUND OF THE INVENTION

The advent of the laser has generated considerable interest in optical circuits capable of performing many of the circuit functions now performed at lower frequencies. Among these are the functions of signal limiting and switching. The former is an important component of a frequency-modulated communication system. The latter is of particular interest in optical data processing and memory systems.

SUMMARY OF THE INVENTION

In accordance with the present invention, signal limiting and switching is achieved by means of a saturable absorber which operates to detune a resonant cavity as a function of signal level. At low signal levels, the saturable absorber is characterized by a high attenuation which detunes the cavity and, thereby, causes the cavity to reflect substantially all the incident wave energy. At signal levels above a threshold level characteristic of the system, the attenuation decreases abruptly, and the cavity transmits substantially all the incident wave energy.

As the signal level is decreased, the cavity continues to transmit most of the incident signal until a lower threshold level is reached, at which point the medium again becomes a high attenuator and the cavity once again is detuned. The hysteresis effect thus produced can be utilized to form a bistable optical circuit for use in optical data-processing and memory networks.

These and other objects and features of the invention will be more clearly understood from the following detailed description taken in conjunction with the drawing.

DETAILED DESCRIPTION

Figure 1:
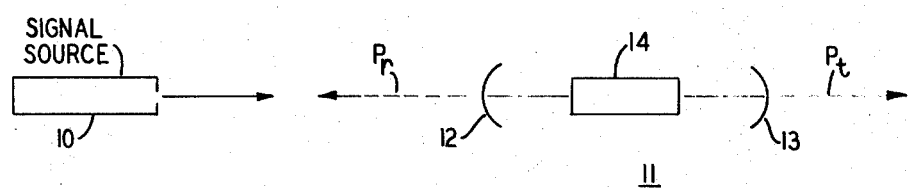
FIG. 1 shows a first embodiment of the invention.

Referring to the drawings, FIG. 1 shows a first embodiment of the invention, included primarily to illustrate the principles of the invention, comprising a signal source 10 of variable output intensity; a cavity 11, defined by reflectors 12 and 13, tuned to resonate at the signal frequency; and a saturable absorber 14 disposed within the cavity.

Saturable absorbers are characterized by power absorption characteristics which decrease with increasing applied power. The power range over which this transition occurs and the total change in attenuation depend upon the material. Many such materials are known and, thus, the particular material that is used would depend upon the frequency and the available intensity range of the signal. Typically, however, the change in absorption is relatively gradual. The present invention is based upon the recognition that this change can be made to occur abruptly by locating the saturable absorber in a resonant cavity. This is the result of a regenerative process which occurs in the vicinity of the knee of the saturation curve. In accordance with this process, a slight increase in applied power causes a slight decrease in the cavity absorption which, in turn, permits the cavity to accept more power. This added power further saturates the saturable absorber which again permits more power to be coupled into the cavity. This process is cumulative, with the net result that the change in the power level within the cavity exceeds the original small change in the incident power. Thus, there is a threshold level at which the system is unstable and abruptly switches states.

A similar process is involved as the power is reduced, causing the system to abruptly switch from a low attenuation state to a high attenuation state at some lower threshold level.

Referring again to FIG. 1, mirrors 12 and 13, while highly reflective at the signal frequency, are capable of transmitting a small fraction of the energy incident thereon. As in the case of any cavity, the amount of coupling between the cavity and associated circuits determines the cavity Q and, hence, the bandpass characteristics of the cavity.

In the absence of the saturable absorber 14, essentially all the energy at the cavity frequency that is coupled into cavity 11 through mirror 12 would be transmitted through the cavity and out through mirror 13. The presence of a high attenuator, such as absorber 14, within the cavity, however, destroys this ability to transmit and, instead, essentially all the incident energy is reflected. In FIG. 1 the transmitted energy is designated $P_t$ and the reflected energy is designated $P_r$.

As explained hereinabove, because of the ability of the saturable absorber to shift between a high attenuating state and low attenuating state, as a function of signal level, the cavity structure shown in FIG. 1 has the ability to recognize changes in level of the applied signal and respond thereto by switching between a reflecting state and a transmitting state. These transitions are illustrated by the curves of FIGS. 2 and 3 which show, respectively, the variations in the reflected energy $P_r$ and the transmitted energy $P_t$ as a function of the applied signal $P_{in}$.

At levels of applied signal below $P_1$, the saturable absorber is highly attenuating, and essentially all the applied power is reflected. This is indicated by curve 1 in FIG. 2. Some relatively small amount of energy is transmitted, as indicated by curve 2 in FIG. 3.

Figure 2:
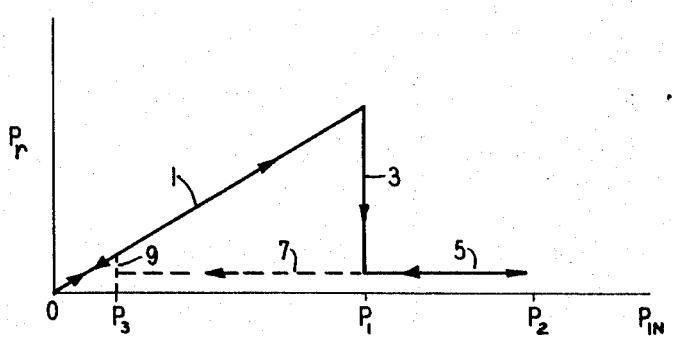
FIGS. 2 and 3, included for purposes of explanation, show the variations in reflected and transmitted power, for the embodiment of FIG. 1, as a function of incident signal power.
Figure 3:
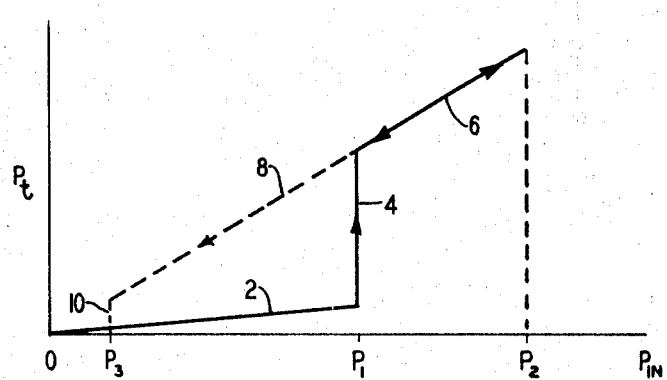

At the threshold level $P_1$, there is an abrupt decrease in the amount of power reflected, as indicated by curve 3 in FIG. 2. Simultaneously, there is an abrupt increase in the amount of power transmitted, as indicated by curve 4 in FIG. 3.

Above the threshold level $P_1$, the amount of reflected power remains essentially constant as the incident power is increased. The transmitted power, on the other hand, increases as the applied power is increased. These variations are depicted by curves 5 and 6 of FIGS. 2 and 3, respectively.

As the incident power is decreased from above $P_1$, the device responds in a somewhat different manner. Because of the high field intensity that builds up with the cavity, the saturable absorber 14 is maintained in its low attenuation state even though the incident power is decreased below the threshold level $P_1$. As a consequence, the level of reflected power remains low, as indicated by the broken line curve 7 in FIG. 2. Essentially, all the incident power continues to be transmitted, as indicated by curve 8 of FIG. 3. This state of affairs continues until the incident power reaches a lower threshold level $P_3$, at which the signal intensity within the cavity is incapable of sustaining the saturable absorber in its low loss state. The absorber then switches to its high loss state, accompanied by a detuning of the cavity. This results in an abrupt increase in the reflected power, as illustrated by curve 9, and a correspondingly sudden decrease in the transmitted power, as indicated by curve 10 in FIG. 3.

As can be seen from both FIGS. 2 and 3, the curves defining the operation of the invention illustrated in FIG. 1 are not independent of the prior history of the saturable absorber 14. That is, switching between attenuation states occurs at different levels, depending upon whether the incident power is increasing or decreasing. The resulting hysteresis effect makes it possible to store information in such a device in a manner now to be explained in connection with the preferred embodiment of the invention illustrated in FIG. 4.

Figure 4:
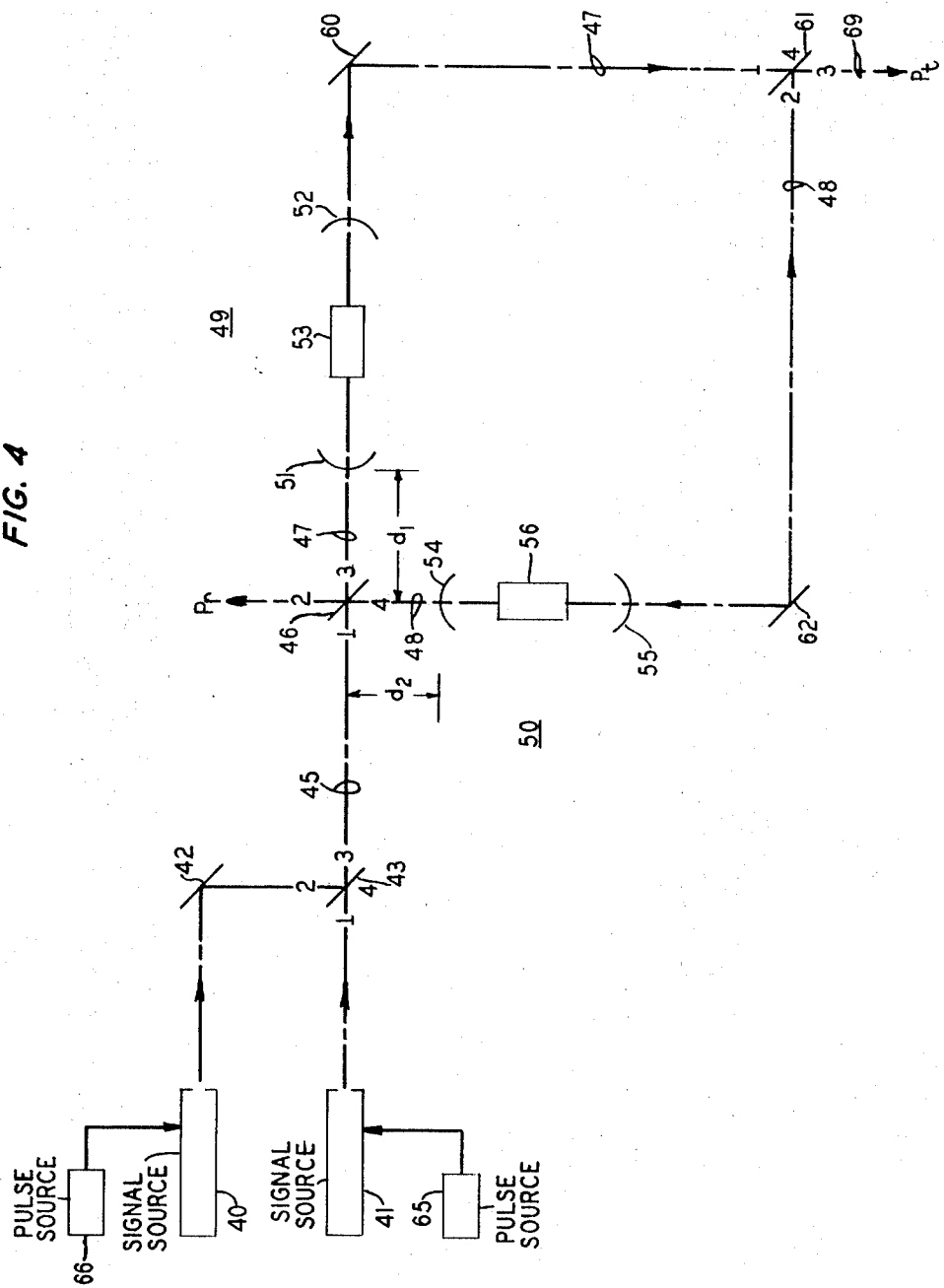
FIG. 4 shows a preferred embodiment of the invention.

The embodiment of FIG. 4 comprises two signal sources 40 and 41 and a coupling circuit comprising a beam redirector 42 and a hybrid junction 43 for combining the outputs from these sources for propagation along a common wavepath 45.

The signal is incident upon a second hybrid junction 46 which divides the incident signal into two equal components for propagation along two different wavepaths 47 and 48. Each of the wavepaths includes a cavity of the type illustrated in FIG. 1 and means for redirecting the wave energy propagating therealong to a third hybrid junction wherein the signals in the two wavepaths are again recombined along a common output wavepath 69.

Referring more specifically to wavepath 47, cavity 49 included therein comprises a pair of partially transmissive reflectors 51 and 52 and a saturable absorber 53 disposed therebetween. A beam redirector 60 redirects wave energy emitted through reflector 52 to the third hybrid junction 61.

Similarly, wavepath 48 includes a cavity 50 comprising partially transmissive reflectors 54 and 55, and a saturable absorber 56 disposed therebetween. A beam redirector 62 redirects wave energy emitted through reflector 55 to hybrid junction 61.

While the teachings of the present invention are applicable generally at all frequencies, the present invention is of particular interest at optical frequencies. Accordingly, in the embodiment of FIG. 4, signal sources 40 and 41 are, for purposes of explanation, optical signal sources, such as lasers; beam redirectors 42, 60 and 62 are totally reflecting mirrors; reflectors 51, 52, 54 and 55 are partially transmissive mirrors; and hybrid junctions 43, 46 and 61 are semitransparent mirrors, or beam splitters. Since a semitransparent mirror has the properties of a 3 db. quadrature coupler, its operation is conveniently described with reference to two pairs of conjugate ports labeled 1-2 and 3-4. Thus, an incident beam can be considered as entering one port of the coupler and the divided beam components as leaving by way of the two coupled ports.

In operation, a beam of optical energy, propagating along wavepath 45, enters port 1 of beam splitter 46 and is divided into two equal beam components. The transmitted component leaves the beam splitter by way of port 3 and propagates along wavepath 47 to cavity 49. The reflected beam components leave the beam splitter by way of port 4 and propagates along wavepath 48 to cavity 50. With the saturable absorbers in their high loss state, substantially all of the incident wave energy is reflected back towards beam splitter 46. By adjusting the distances $d_1$ and $d_2$ between the beam splitter and the respective cavities such that $d_1-d_2=2\pi n\lambda$, where $n$ is any integer and $\lambda$ is the beam wavelength, the reflected beam components recombine in port 4 to produce an output beam $P_r$.

If, on the other hand, the saturable absorbers 53 and 56 are in their low-loss state, the incident beam components are transmitted through the cavities and are directed by means of mirrors 60 and 62 into ports 1 and 2 of beam splitter 61. By adjusting the path lengths, the beam components can be made to recombine in either ports 3 or 4 of beam splitter 61. In the illustrative embodiment shown, the beam components are shown recombined in port 3 to produce an output beam $P_t$.

The state of the saturable absorbers 53 and 56 is, as indicated in the earlier discussion, dependent upon its previous history. That is, once below the lower threshold level $P_3$, they will be and will remain in their high attenuation state until raised above their upper threshold level $P_1$. Similarly, once above the upper threshold level, they will remain in their low attenuation state until lowered below their lower threshold level. In the embodiment of FIG. 4, the state of these materials is determined by signal sources 40 and 41. In particular, one of the signal sources 40 is a continuous wave source whose output is such that the level of the beam component it produces at cavities 49 and 50 is greater than the lower threshold level but less than the upper threshold level. Thus, by itself, source 40 cannot cause the saturable absorbers to switch states.

Source 41, which operates at the same frequency as source 40 is a pulsed signal source whose output intensity, when on, is sufficient to increase the total beam level at the cavities to a level greater than the threshold level. Thus, when on simultaneously, the combined power produced by sources 40 and 41 will cause the saturable absorbers to switch from their high to their low-loss states. To switch from their high-loss state to their low-loss state, both sources must be off.

For purposes of illustration and explanation, we assume that the absorbers are in their high attenuation state, and source 40, being a c.w. source, is on. Under these conditions, all the incident power is delivered to port 2 of beam splitter 46. This condition defines one state of the apparatus which will persist so long as source 40 is on and nothing occurs to alter the state of the saturable absorbers. If, however, source 41 is pulsed on by means of a pulse source 65, the combined signal level at the cavities is raised sufficiently to switch the absorbers to their low-loss state and, thereby, switch all the output power from port 2 of beam splitter 46 to port 3 of beam splitter 61. Because of the hysteresis effect described hereinabove, source 41 can be turned off, leaving the apparatus in its second stable state. All the incident power will continue to be delivered to port 3 of beam splitter 61 until a pulse, derived from a pulse source 66, turns signal source 40 off. This reduces the signal to a level below the lower threshold level and, as a result, causes the saturable absorbers to switch to their high attenuation state. At the conclusion of the off pulse following this transition, substantially all the incident energy is again reflected and delivered to port 2 of beam splitter 46.

As is evident from the above, the circuit disclosed in FIG. 4 is a bistable optical circuit which can be used as a memory circuit or in any other of the well-known ways in which such circuits are commonly employed.

As indicated above, source 40 is a c.w. source, such as a laser, which is switched off at intervals in response to a signal from a pulse source 66. The switching can be accomplished by means of a mechanical shutter mechanism, or by means of an intracavity acoustic modulator of the type described in U.S. Pat. No. 3,412,251. Source 41 can be any one of the many well-known Q-switched lasers.

As an example of one specific embodiment of the invention, a $CO_2$ laser can be used with a sulfur hexafluoride absorption cell. Other combinations of sources and absorbers will be known to those skilled in the art. Accordingly, it will be understood that the above-described arrangements are illustrative of but a small number of the many possible specific embodiments which can represent the principles of of the invention. Numerous and varied other arrangements can readily be devised in accordance with these principles by those skilled in the art without departing from the spirit and scope of the invention.

I claim:

1. In combination:
   a source of electromagnetic wave energy;
   a resonant cavity tuned to the frequency of said wave energy, including therein only a saturable absorber;
   means for coupling said wave energy into and out of said cavity;
   and means for varying the intensity of the wave energy coupled into said cavity to a level to cause said saturable absorber to switch between its high and low attenuating states.

2. The combination according to claim 1 wherein said cavity comprises two partially transmissive reflectors;
   and wherein said source is a laser.

3. A bistable circuit comprising:
   a power divider for dividing an electromagnetic wave signal into two equal components directed along two different wavepaths;
   each of said wavepaths including a resonant cavity tuned to the frequency of said signal and including therein a saturable absorber;
   and means for recombining along a common wavepath wave energy transmitted through said cavities.

4. The circuit according to claim 3, including a signal source of variable intensity.

5. The circuit according to claim 3 wherein said electromagnetic wave signal is an optical beam;
   said power divider and said recombining means are beam splitters;
   and wherein each of said cavities comprises a pair of partially transmissive mirrors.

6. The circuit according to claim 3 wherein said signal is derived from a pair of lasers;
characterized in that:
the first of said lasers is a continuous wave source whose output intensity is insufficient to cause said saturable absorber to switch from its high attenuation state to its low attenuation state;
the second of said lasers is a pulsed laser which, when on, increases the combined intensity of said two lasers to a level sufficient to switch said absorber to its low attenuation state;
means for pulsing said lasers on and off;
and means for combining the output signals from said lasers and directing said combined signal into said power divider.